United States Patent
Hasegawa et al.

(10) Patent No.: US 9,616,542 B2
(45) Date of Patent: Apr. 11, 2017

(54) MANUFACTURE OF SYNTHETIC QUARTZ GLASS SUBSTRATE

(71) Applicant: Shin-Etsu Chemical Co., Ltd., Tokyo (JP)

(72) Inventors: Ryouhei Hasegawa, Joetsu (JP); Harunobu Matsui, Joetsu (JP); Daijitsu Harada, Joetsu (JP); Masaki Takeuchi, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 13/756,826

(22) Filed: Feb. 1, 2013

(65) Prior Publication Data

US 2013/0203324 A1    Aug. 8, 2013

(30) Foreign Application Priority Data

Feb. 2, 2012   (JP) .................... 2012-020729

(51) Int. Cl.
  *B24B 1/00*   (2006.01)
  *C09G 1/02*   (2006.01)
  *B24B 37/04*  (2012.01)

(52) U.S. Cl.
  CPC .............. *B24B 1/00* (2013.01); *B24B 37/044* (2013.01); *C09G 1/02* (2013.01)

(58) Field of Classification Search
  CPC ........... B24B 1/00; C01G 25/02; C03C 19/00; C03C 3/06; C09G 1/02; H01L 21/02024
  USPC ....................... 216/31, 89; 451/41
  See application file for complete search history.

(56) References Cited

U.S. PATENT DOCUMENTS

| | | | |
|---|---|---|---|
| 2,996,369 A | 8/1961 | Harris et al. | |
| 3,222,148 A | 12/1965 | Hay | |
| 3,301,646 A | 1/1967 | Smoot | |
| 3,685,218 A * | 8/1972 | Gambale | C09K 3/1454 106/3 |
| 6,328,644 B1 * | 12/2001 | Kuramochi et al. | 451/526 |
| 7,402,258 B2 * | 7/2008 | Kiehlbauch et al. | 216/83 |
| 8,357,311 B2 * | 1/2013 | Shirota et al. | 252/79.1 |
| 8,500,517 B2 * | 8/2013 | Harada et al. | 451/37 |
| 2002/0042243 A1 * | 4/2002 | Ihsikawa | B24B 37/013 451/6 |
| 2004/0192171 A1 | 9/2004 | Koike | |
| 2005/0137077 A1 * | 6/2005 | Bange et al. | 501/127 |
| 2006/0255314 A1 * | 11/2006 | Suzuki | C09G 1/02 252/79.1 |
| 2007/0145014 A1 * | 6/2007 | Nishimoto | C03C 19/00 216/97 |
| 2008/0254718 A1 | 10/2008 | Takakuma et al. | |
| 2009/0084042 A1 * | 4/2009 | Ramanath et al. | 51/296 |
| 2010/0056026 A1 * | 3/2010 | Shirota | C09G 1/02 451/41 |
| 2010/0243950 A1 * | 9/2010 | Harada et al. | 252/79.5 |
| 2011/0287219 A1 * | 11/2011 | Matsui et al. | 428/141 |
| 2012/0021675 A1 * | 1/2012 | Matsui et al. | 451/36 |
| 2012/0035046 A1 * | 2/2012 | Rosenflanz | 501/135 |

FOREIGN PATENT DOCUMENTS

| | | |
|---|---|---|
| EP | 2 338 849 A1 | 6/2011 |
| JP | 64-040267 A | 2/1989 |
| JP | 2004-291209 A | 10/2004 |
| JP | 2010-16064 A | 1/2010 |

OTHER PUBLICATIONS

Extended European Search Report issued Jun. 5, 2013, in European Patent Application No. 13153677.3.
Japanese Office Action, dated Nov. 10, 2015, for Japanese Application No. 2013-008295.

* cited by examiner

*Primary Examiner* — Shamim Ahmed

(74) *Attorney, Agent, or Firm* — Birch, Stewart, Kolasch & Birch, LLP

(57) ABSTRACT

A rough surface of a starting synthetic quartz glass substrate is polished to a mirror finish, using a polishing slurry containing tetragonal or cubic zirconia.

16 Claims, No Drawings

MANUFACTURE OF SYNTHETIC QUARTZ GLASS SUBSTRATE

CROSS-REFERENCE TO RELATED APPLICATION

This non-provisional application claims priority under 35 U.S.C. §119(a) on Patent Application No. 2012-020729 filed in Japan on Feb. 2, 2012, the entire contents of which are hereby incorporated by reference.

TECHNICAL FIELD

This invention relates to a method for manufacturing a synthetic quartz glass substrate by mirror finish polishing with a zirconia-laden polishing slurry.

BACKGROUND ART

Factors representing the quality of synthetic quartz glass substrates include defect size, defect density, flatness, surface roughness (RMS or root mean square), material photochemical stability, and surface chemical stability. The quality requirement for defects on substrates becomes severer with the current trend toward further miniaturization of ICs. Accordingly efforts are made to ameliorate the method for manufacturing synthetic quartz glass substrates. In fact, improvements in RMS and defect quality have been introduced. The polishing process generally involves the steps of lapping a substrate to a rough surface, pre-polishing the rough surface to a mirror finish, and precision polishing. The pre-polishing step commonly uses a cerium oxide-based polishing slurry as disclosed in Patent Document 1. The subsequent precision polishing step is typically performed by a float polishing technique. Patent Document 2 discloses the float polishing technique using a polishing slurry containing fine grains of zirconium oxide or aluminum oxide.

However, the ceria-based polishing slurry of Patent Document 1 is uneconomical because of the rising price of cerium. It is urgently required to seek for a replacement. On the other hand, the method of Patent Document 2 using zirconia or alumina suffers from low productivity because a long time is necessary until a rough surface substrate as lapped is polished to a mirror finish.

CITATION LIST

Patent Document 1: JP-A S64-40267
Patent Document 2: JP-A 2004-291209

DISCLOSURE OF INVENTION

An object of the invention is to provide a method for manufacturing a synthetic quartz glass substrate by polishing a substrate as lapped with a zirconium oxide-laden polishing slurry to a mirror finish, with the polishing step having the benefit of cost saving.

The inventors have discovered zirconium oxide ($ZrO_2$) of specific crystal system which can be used in the pre-polishing step during the manufacture of a synthetic quartz glass substrate.

The invention provides a method for manufacturing a synthetic quartz glass substrate, comprising the step of polishing a rough surface of a starting synthetic quartz glass substrate with a polishing slurry containing tetragonal or cubic zirconium oxide to a mirror finish.

In a preferred embodiment, the tetragonal or cubic zirconium oxide has been structured and stabilized using an alkaline earth oxide or rare earth oxide. The alkaline earth oxide is typically magnesium oxide or calcium oxide. The rare earth oxide is typically yttrium oxide or scandium oxide.

Preferably, the rough surface of the starting glass substrate has a surface roughness (RMS) of 0.05 to 0.50 μm, and the mirror finished surface of the resulting glass substrate has a surface roughness (RMS) of up to 30 nm. More preferably the zirconium oxide has an average particle size of 0.3 to 10.0 μm.

ADVANTAGEOUS EFFECTS OF INVENTION

When a synthetic quartz glass substrate is polished to a mirror finish, zirconium oxide is used as a replacement for ceria of the rising cost, thereby saving the cost without detracting from polishing quality. Zirconium oxide which is believed difficult to use except for precision polishing can now be used in the pre-polishing step.

DESCRIPTION OF PREFERRED EMBODIMENTS

According to the method of the invention, a synthetic quartz glass substrate is manufactured through the step of polishing a rough surface of a starting synthetic quartz glass substrate with a polishing slurry to a mirror finish. The polishing slurry contains tetragonal or cubic zirconium oxide.

The zirconium oxide (or zirconia) used herein is obtained by doping monoclinic zirconium oxide with a stabilizer such as an alkaline earth oxide or rare earth oxide for converting the crystal structure to a tetragonal or cubic system which is stabilized to inhibit rearrangement to the monoclinic system. Pure zirconium oxide ($ZrO_2$), in a high temperature zone, undergoes a rearrangement of its crystal structure from monoclinic system (low-temperature phase) to tetragonal or cubic system (high-temperature phase) and hence, a change (~7%) of its volume. Then, as a volume change concomitant with a temperature change is repeated, the crystal structure is broken. In contrast, tetragonal or cubic zirconium oxide structured by doping of the stabilizer is stabilized in that a rearrangement of the crystal structure is inhibited.

Tetragonal or cubic zirconia used herein may be prepared by any well-known methods. For example, a raw ore such as zirconium silicate ($ZrSiO_4$) is heat treated in a high-temperature melting furnace. This desilication treatment yields monoclinic zirconia. In the high-temperature melting furnace, it is reacted with an alkaline earth oxide or rare earth oxide, followed by grinding and sieving, yielding tetragonal or cubic zirconia grains. The amount of alkaline earth oxide or rare earth oxide added is preferably 1 to 20 parts by weight, more preferably 1 to 10 parts by weight per 100 parts by weight of the monoclinic zirconia. Provided that a proportion of zirconia having the tetragonal or cubic crystal structure in the entire product is referred to as "percent stabilization," it is preferred in the practice of the invention to use a zirconia product having a percent stabilization of 70 to 100%, more preferably 90 to 100%, even more preferably 95 to 100%.

Examples of the alkaline earth oxide include magnesium oxide and calcium oxide. Examples of the rare earth oxide include yttrium oxide and scandium oxide.

In the prior art, tetragonal or cubic zirconia is used as abrasive for silicon wafers and soft glass members such as soda lime glass and optical glass, but not for hard glass members such as synthetic quartz glass. The reason is based on the general knowledge that when soft glass members are polished with a polishing slurry containing tetragonal or cubic zirconia and with a polishing slurry containing ceria and compared with respect to RMS and polishing rate, those members polished with zirconia have rough surfaces and low polishing rates. Then it is unlikely for the skilled artisan to use a polishing slurry containing tetragonal or cubic zirconia in polishing of synthetic quartz glass substrates, i.e., hard glass members which tend to have rougher surfaces and lower polishing rates than the soft glass members.

Quite unexpectedly, the inventors have found that when a polishing slurry containing tetragonal or cubic zirconia is used in pre-polishing of synthetic quartz glass substrates, the polished substrates are improved in quality (roughness) and polishing rate. It is believed that in the polishing with a polishing slurry containing tetragonal or cubic zirconia, not only mechanical polishing, but also chemical polishing occur.

For example, soft glass members can be polished with a polishing slurry containing various types of zirconia including tetragonal, cubic and monoclinic zirconia if under an applied pressure. No substantial difference is noticeable among different types of abrasives. This is because mechanical polishing is predominant.

This is not true in the case of hard glass members such as synthetic quartz glass substrates. If rough surface substrates are polished with a polishing slurry containing monoclinic zirconia under high pressure, abrasive grains are caught in asperities on the substrate surface. No sufficient polishing action is exerted. That is, the surface is not mirror finished.

In contrast, tetragonal or cubic zirconia has oxygen defects formed in the crystal structure due to the stabilizer such as alkaline earth oxide or rare earth oxide, and undergoes a pseudo-transition from $Zr^{4+}$ to an unstable state of $Zr^{3+}$. This state invites nucleophilic displacement reaction with $SiO_2$ bonds on the synthetic quartz glass substrate surface wherein zirconia acts as electrophile and $SiO_2$ acts as nucleophile. Chemical polishing occurs on the rough surface of synthetic quartz glass substrate, smoothing out asperities from the substrate surface. As asperities on the substrate surface become smaller, mechanical polishing is more likely to take place along with chemical polishing. As a result, the rough surface substrate can be polished to a mirror finish.

The tetragonal or cubic zirconia preferably has an average particle size of 0.3 to 10.0 μm, more preferably 0.7 to 2.0 μm. An average particle size of less than 0.3 μm may lead to a slow polishing rate. If the size exceeds 10.0 μm, pits may form on the substrate surface, which are the cause of defects. Once defects are formed in the pre-polishing step, such defects are difficult to remove even by precision polishing following the pre-polishing step. It is noted that the average particle size of zirconia is measured by a laser diffraction particle size distribution analyzer SALD-200VER of Shimadzu Corp.

The polishing slurry used herein is preferably prepared by dispersing tetragonal or cubic zirconia in water, an organic solvent (typically an alcohol such as methanol) or a mixture thereof in a solid concentration of 1 to 30% by weight, more preferably 10 to 20% by weight.

Preferably a dispersant is added to the polishing slurry for the purpose of facilitating dispersion or improving a polishing rate via activation of abrasive grains. Suitable dispersants include polyacrylic acid, sodium polyacrylate, acrylate copolymers, polyvinyl pyrrolidone, polyvinyl alcohol, maleic acid, phthalic acid, malic acid, methacrylic acid, and alkylene glycols such as ethylene glycol and propylene glycol. Preferred are those dispersants having an average molecular weight of 3,000 to 30,000 as measured by gel permeation chromatography. The dispersant is preferably added to the polishing slurry in a concentration of 0.1 to 1.0% by weight, preferably 0.2 to 0.5% by weight.

The starting synthetic quartz glass substrate is provided by slicing a synthetic quartz glass ingot to a predetermined thickness by means of a wire saw, and lapping the slice with an alumina-based slurry to remove the work affected layer and cracks from the slice, thus yielding a substrate having a rough surface. As used herein, the term "rough surface" of substrate refers to a substrate having a surface roughness (RMS) of preferably 0.05 to 0.50 μm, more preferably 0.05 to 0.20 μm, and even more preferably 0.05 to 0.10 μm. A lower roughness (RMS) prior to the pre-polishing step indicates less residual strain by machining, and offers the advantage that the material removal of the pre-polishing step is reduced. To provide a substrate with RMS of less than 0.05 μm, the lapping step must use a slurry based on alumina with a smaller particle size, which can detract from the efficiency of the lapping step. If a substrate has a RMS in excess of 0.50 μm, a time is taken until the work (wire sawing) affected layer is removed by the pre-polishing step, and thus the pre-polishing step may become less productive. Notably, the RMS is measured as will be described later.

The lapping step is followed by the pre-polishing step, which is to polish the rough surface of substrate to smooth out asperities from the substrate to a mirror finish. Strain is removed little by little by letting abrasive grains collide against the substrate surface in a narrow gap between the polishing tool and the workpiece (or substrate). Accordingly, the pre-polishing step achieves strain-free working, despite a lower working efficiency than the lapping step. The pre-polishing step is preferably at a polishing rate of 10 to 30 μm/hr, more preferably 15 to 25 μm/hr. Outside the range, a higher rate may cause surface roughening and require a larger tool load, which can cause tool failure, whereas a lower rate may detract from productivity.

The pre-polishing step results in a substrate having a mirror-finished surface. As used herein, the term "mirror-finished surface" of substrate refers to a substrate having a surface roughness (RMS) of preferably up to 30 nm, more preferably up to 1.5 nm, even more preferably up to 1.0 nm, and most preferably up to 0.8 nm. If a mirror-finish surface substrate has an RMS in excess of 30 nm, the final polishing (or precision colloidal polishing) step following the pre-polishing step may require a greater amount of removal or fail to reach a high flatness. The lower limit of RMS of mirror-finish surface substrate is not critical, with lower values being better.

A double-side polishing machine may be used in the pre-polishing step. Specifically, the machine includes upper and lower polishing plates, to which polyurethane pads or non-woven pads are attached. While the substrate held by a carrier is interposed between the polishing faces, the upper and lower polishing plates are relatively rotated, thereby polishing the major surfaces of the substrate.

Following the pre-polishing step, the substrate is precision polished, cleaned and dried in a standard way, obtaining a final synthetic quartz glass substrate.

A double-side polishing machine may be used in the precision polishing step. Specifically, the machine includes upper and lower polishing plates, to which flexible suede pads are attached. While the substrate held by a carrier is interposed between the polishing faces, the upper and lower polishing plates are relatively rotated, thereby polishing the major surfaces of the substrate. A polishing slurry used in the precision polishing step preferably contains a monodispersed colloidal particle having a primary particle size of 20 to 500 nm as a primary component in deionized water. Examples of the colloidal particle include a colloidal zirconia and colloidal silica.

The synthetic quartz glass substrate manufactured in the invention finds use as a semiconductor electronic material. The substrate is especially suitable for use as a photomask, liquid crystal color filter, and magnetic device as well as for use in the nanoimprint technology.

EXAMPLE

Examples and Comparative Examples are given below by way of illustration, but the invention is not limited thereto.

Example 1

A synthetic quartz glass substrate (30×30×6.5 mm thick) as sliced from an ingot was lapped on a double-side lapping machine of planetary motion, yielding a substrate having a rough surface. This substrate was subject to the pre-polishing step. The substrate prior to the pre-polishing step was measured for surface roughness (RMS) at two points near the center and two points near the edge and over an area of 1 μm squares. An average RMS value was 0.320 μm. The RMS was measured by atomic force microscope (NANO-IM-8 by Pacific Nanotechnology Inc.).

The pre-polishing step used a polishing slurry of 10% by weight zirconia doped with calcia to be tetragonal or cubic (by Daiichi Kigenso Kagaku Kogyo Co., Ltd., particle size 1.2 μm, percent stabilization 90-100%), to which an aqueous solution of sodium polyacrylate having an average molecular weight of 30,000 was added as dispersant in a concentration of 0.2% by weight. A 5B Type compact double-side polishing machine included upper and lower polishing plates to which flexible urethane pads were attached. While the substrate was held by a carrier (30.6×30.6×5.0 mm thick), it was polished under a load of 100 gf/cm$^2$ for 3 hours by rotating the polishing plates at 70 rpm (a material removal amount sufficient to remove residual strain by slicing and lapping was at least 50 μm).

After polishing, the substrate was cleaned and dried. The substrate was measured for surface roughness (RMS) at two points near the center and two points near the edge and over an area of 1 μm squares, and the RMS measurements were averaged. Before and after the polishing step, the thickness of the substrate was measured near the center and near the edge by a micrometer, from which a polishing rate was computed. The results included an average RMS of 0.8 nm and a polishing rate of 20.7 μm/hr, which were both satisfactory.

Example 2

Polishing was performed under the same conditions as in Example 1 aside from using a polishing slurry of zirconia doped with magnesia to be tetragonal or cubic (by Daiichi Kigenso Kagaku Kogyo Co., Ltd., particle size 1.2 μm, percent stabilization 70-100%).

The substrate was evaluated as in Example 1, finding a RMS of 0.398 μm prior to the pre-polishing step, a RMS of 0.8 nm after the pre-polishing step and a polishing rate of 20.3 μm/hr. The RMS and polishing rate were both satisfactory.

Example 3

Polishing was performed under the same conditions as in Example 1 aside from using a polishing slurry of zirconia doped with yttria to be tetragonal or cubic (by Daiichi Kigenso Kagaku Kogyo Co., Ltd., particle size 1.2 μm, percent stabilization 90-100%).

The substrate was evaluated as in Example 1, finding a RMS of 0.403 μm prior to the pre-polishing step, a RMS of 0.8 nm after the pre-polishing step and a polishing rate of 19.7 μm/hr. The RMS and polishing rate were both satisfactory.

Example 4

The pre-polished synthetic quartz glass substrate obtained in Example 1 was subject to a precision polishing step. The precision polishing step used a colloidal silica aqueous dispersion (by Fujimi Incorporated, particle size 75.7 nm) having $SiO_2$ concentration of 40% by weight. A 5B Type double-side polishing machine included upper and lower polishing plates to which flexible suede pads were attached. The substrate was polished under a load of 100 gf/cm$^3$ and removed a sufficient amount (2 μm or more) to remove scratches which had been caused before the pre-polishing step was finished.

After polishing, the substrate was cleaned and dried. The substrate was measured for surface roughness (RMS) at two points near the center and two points near the edge and over an area of 1 μm squares, and the RMS measurements were averaged to be 0.12 nm.

Comparative Example 1

Polishing was performed under the same conditions as in Example 1 aside from using a polishing slurry of 10% by weight monoclinic zirconia (by Daiichi Kigenso Kagaku Kogyo Co., Ltd., particle size 1.2 μm).

The substrate was evaluated as in Example 1, finding a RMS of 0.452 μm prior to the pre-polishing step and a RMS of 0.443 μm after the pre-polishing step. The RMS remained substantially unchanged. The polishing rate was 0 μm/hr. The polishing step was ineffective.

Japanese Patent Application No. 2012-020729 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for manufacturing a synthetic quartz glass substrate, comprising:
   pre-polishing a rough surface of a starting synthetic quartz glass substrate to a mirror finish; and then
   precision polishing the pre-polished surface of the synthetic quartz glass substrate, wherein
   said pre-polishing is conducted by using a polishing pad with a polishing slurry which contains tetragonal or cubic zirconium oxide as polishing particles and is exclusive of cerium oxide.

2. The method of claim 1 wherein the tetragonal or cubic zirconium oxide has been structured and stabilized using an alkaline earth oxide or rare earth oxide.

3. The method of claim 2 wherein the alkaline earth oxide is magnesium oxide or calcium oxide.

4. The method of claim 2 wherein the rare earth oxide is yttrium oxide or scandium oxide.

5. The method of claim 1 wherein the rough surface of starting synthetic quartz glass substrate has a surface roughness (RMS) of 0.05 to 0.50 μm.

6. The method of claim 1 wherein the mirror finished surface of synthetic quartz glass substrate has a surface roughness (RMS) of up to 30 nm.

7. The method of claim 1, wherein the tetragonal or cubic zirconium oxide has an average particle size of 0.3 to 10.0 μm.

8. The method of claim 1, wherein the tetragonal or cubic zirconium oxide is a stabilized zirconium oxide.

9. The method of claim 1, wherein a polishing rate in the pre-polishing step is 10 to 30 μm/hr.

10. The method of claim 1, wherein the pre-polishing step is conducted by using a double-sided polishing machine.

11. The method of claim 1, which further comprises a step of providing said starting substrate by slicing a synthetic quartz glass ingot and lapping the slice.

12. The method of claim 11, wherein said lapping is conducted with alumina-based slurry.

13. The method of claim 1, wherein said precision polishing is conducted with colloidal particles.

14. The method of claim 1, wherein said precision polishing is followed by cleaning and drying so that a final synthetic quartz glass substrate is obtained.

15. The method of claim 1, wherein the polishing pad comprises polyurethane pads or non-woven pads.

16. The method of claim 1, wherein the polishing particles of the polishing slurry consists of the tetragonal or cubic zirconium oxide.

* * * * *